United States Patent [19]

Horie

[11] Patent Number: 5,181,194
[45] Date of Patent: Jan. 19, 1993

[54] WRITING DEVICE FOR OPTICAL MEMORY CARD

[75] Inventor: Kiyoshi Horie, Yokohama, Japan
[73] Assignee: Kabushiki Kaisha CSK, Tokyo, Japan
[21] Appl. No.: 436,554
[22] Filed: Nov. 14, 1989
[51] Int. Cl.$^5$ ............................................... G11B 7/00
[52] U.S. Cl. ............................... 369/44.25; 369/44.33
[58] Field of Search ............... 369/44.25, 44.35, 44.36, 369/44.31, 44.38, 44.39, 44.33, 116, 44.29, 44.34

[56] References Cited

U.S. PATENT DOCUMENTS

| | | | |
|---|---|---|---|
| 4,128,847 | 12/1978 | Roullet et al. | 369/44.29 |
| 4,554,652 | 11/1985 | Maeda et al. | 369/44.33 |
| 4,730,290 | 3/1988 | Takasago et al. | 369/44.33 |
| 4,807,210 | 2/1989 | Kaku et al. | 369/44.31 |
| 4,912,697 | 3/1990 | Enari et al. | 369/116 |
| 4,956,832 | 9/1990 | Miyasaka | 369/116 |
| 4,982,297 | 1/1991 | Tsujisawa | 369/44.34 |
| 4,982,392 | 1/1991 | Soejima | 369/44.33 |

*Primary Examiner*—Donald McElheny, Jr.
*Attorney, Agent, or Firm*—Lackenbach Siegel Marzullo & Aronson

[57] ABSTRACT

A writing device for an optical memory card is disclosed. In this writing device, tracking correction is performed by moving a mobile objective lens of an optical system in the transverse direction of a track in accordance with a tracking error of the optical system relative to the optical memory card, and the range in which tracking correcting can be performed is enlarged by moving a retaining portion of the objective lens by a moving device when first comparison device has determined that tracking error information was outside a predetermined first standard range. The writing device includes a writing stoppage device for stopping writing data on the optical memory card when a second comparison device has determined that the tracking error information exceeded a second standard range which is wider than the first standard range. Since the retaining portion of the objective lens is moved in the direction in which any deviation occurring during tracking can be corrected, the range in which tracking correction can be performed can be enlarged. Further, since it is determined that erroneous tracking is occurring and writing of data is stopped when the deviation occurring during tracking for writing data has exceeded the second standard range which is larger than the first standard range, damage to the written data can be prevented.

4 Claims, 5 Drawing Sheets

WRITING DEVICE FOR OPTICAL MEMORY CARD

BACKGROUND OF THE INVENTION

The present invention relates to a writing device for an optical memory card, and more particularly, to a writing device capable of correcting any deviation occurring during tracking in an enlarged range.

BACKGROUND ART

Optical recording media on which digital data is recorded by forming optically changed patterns such as bright and dark pits have recently been attracting considerable attention. Since data can be recorded on such optical recording media at a high density, optical recording media offer the ability to provide large capacity memories. Proposals have therefore been made not only for disk type optical memories but also for card type memories.

In an optical memory card of the above-described type, optically or magneto-optically changed states are formed in a discrete fashion on the surface of the card in correspondence with the data to be recorded, such changed states being read by irradiating an optical beam such as laser beam thereon.

In practice, fine irregularities or a bright and dark pattern may be formed on the surface of the recording medium, i.e., on the surface of the card, and the recorded data is read by utilizing the difference in the reflectivity, the index of refraction or the transmittance of the optical beam irradiated on the fine irregularities or the bright and dark pattern. Alternatively, the thermomagnetically recorded data is read from the recording medium by utilizing variations in polarization caused owing to the magnetooptic effect of the optical beam irradiated on the recording medium.

As shown in FIG. 6, data is generally written on a card 81 on data tracks 82 formed adjacent to and along tracking lines 80 provided in the longitudinal direction of the card 81. Data thus recorded is generally read from or written on any arbitrary data track 82 first by moving a reading or writing optical system in the transverse direction of the tracks and selecting a target data track and then by moving the card 81 in the direction of the tracks and running a reading or writing beam relative to the card 81 along that data track 82 while making the optical system follow the tracking line corresponding to the target data track.

When the optical system follows tracking lines, an optical image 8 of the associated tracking line is first received by light-receiving elements 7a and 7b of a tracking error detector 100, and a signal representing the voltage difference occurring in the outputs of these elements is then taken out from a differential amplifier 9 as a tracking error signal, as shown in FIG. 2. The tracking error signal is a signal proportional to any deviation occurring during tracking. Deviation occurring during tracking is corrected by moving a mobile objective lens of the optical system in the transverse direction of the track in correspondence with this tracking error signal. The mobile objective lens is held on a lens retaining portion provided in the optical system by spring members such as hair springs in such a manner as to be movable in the vertical and horizontal directions. Electromagnetic force is utilized to move the mobile objective lens. Vertical movement of the objective lens is utilized for focusing control, whereas horizontal movement thereof is utilized for the tracking control.

The range in which an objective lens having a diameter of, for example, 3 mm can be moved is limited to, for example, $\pm 400$ $\mu$m, and this makes it impossible for an optical system to cope with any deviation occurring during tracking that exceeds a prescribed level. It is therefore necessary for the skew of the tracking lines relative to the optical system to be restricted to a minimum value. In other words, in the above-described card type optical memory, the tracking lines must be provided parallel to the sides of the card with a high degree of accuracy, and the card must also be supported or moved with a high degree of accuracy.

To solve this problem, the present inventors have proposed to perform tracking correction by moving a mobile objective lens of an optical system in accordance with tracking error information of the optical system relative to an optical memory card and to enlarge the range in which tracking correction can be performed by moving a retaining portion of the objective lens when the tracking error information is outside a predetermined first standard range. However, the use of the objective lens retaining portion for tracking correction raises the following problem when a user writes data on an erasable optical memory card with a writing device. That is, if the range in which tracking correction can be performed is limited to the range in which the objective lens can be moved, as in the case of the conventional writing device, there is no possibility of tracking mistakes occurring in which tracks other than the associated track are affected by a writing beam. However, when the retaining portion is also utilized for tracking correction, tracking mistakes may occur in which the writing beam intersects a plurality of tracks, as shown in FIG. 8, damaging the already written data.

SUMMARY OF THE INVENTION

An object of the present invention is to provide a writing device for an optical memory, the writing device being of the type which also utilizes the movement of a retaining portion for tracking correction, the writing device being capable of preventing damage to written data when tracking errors occur.

To this end, the present invention provides, in one aspect thereof, a writing device for an optical memory card in which tracking correction is performed by moving a mobile objective lens of an optical system in the transverse direction of a track in accordance with a tracking error of the optical system relative to the optical memory card, and in which the range in which tracking correction can be performed is enlarged by moving a retaining portion of the objective lens when tracking error information is outside a predetermined first standard range, as shown in FIG. 1. The writing device is characterized by the inclusion of writing stoppage means for stopping writing data on the optical memory card when the tracking error information exceeds a second standard range which is larger than the first standard range.

The writing device may include first comparison means for determining whether or not the tracking error information is within the predetermined first standard range and for generating a direction signal that represents the direction for correction, second comparison means for determining whether or not the tracking error information is within the second standard range which is larger than the first standard range, correcting signal generating means for generating a correcting signal when the result of the determination conducted by the first comparison means is negative, retaining portion moving means for moving the retaining portion in the direction indicated by the direction signal in response to the correcting signal output from the generating means, and writing stoppage means for stopping writing data on the optical memory when the result of the determination conducted by the second comparison means is negative.

In one form, the writing stoppage means includes a writing driving circuit, and gate means for blocking data from being input to the writing driving circuit when the tracking error information exceeds the second standard range which is larger than the first standard range.

In another form, the writing stoppage means includes a writing driving circuit, and a status register for storing the information representing whether or not the tracking error information has exceeded the second standard range which is larger than the first standard range, whereby generation of data is stopped by the contents of the status register.

The present invention provides, in another aspect thereof, a writing device for an optical memory card in which tracking correction is performed by moving a mobile objective lens of an optical system in the transverse direction of a track in accordance with a tracking error of the optical system relative to the optical memory card, and in which the range in which tracking correction can be performed is enlarged by moving a retaining portion of the objective lens when tracking error information is outside a predetermined first standard range. The writing device is characterized by the inclusion of retaining portion stoppage means for stopping the movement of the retaining portion when the tracking error information has exceeded the second standard range which is larger than the first standard range.

When the retaining portion of the objective lens is moved, it is preferable for a photodetector to be moved together with the retaining portion. The writing device according to the present invention may be replaced by a writing/reading device which is capable of writing data on and reading data from the optical memory card.

When the first comparison means determines that the deviation occurring during tracking is within the predetermined first standard range, tracking is performed by moving the objective lens in the transverse direction of a track. When it has been determined that the deviation occurring during tracking is outside the first standard range, the retaining portion of the mobile objective lens is also moved in the transverse direction of the track so as to perform tracking correction. The above-described first standard range may be set to, for example, a value which corresponds to the maximum movable range of the mobile objective lens. It is to be noted that the standard range may also be set to any value within the maximum movable range of the mobile objective lens. In that case, the range in which tracking mistakes are detected is narrowed, and this allows the damage to the written data to be more reliably prevented. In practice, the standard range may be set to the potential difference required to move an optical beam to an adjacent track. In a case where the retaining portion is of the fixed type as in the conventional tracking device, the objective lens retaining portion is also moved in the direction in which any deviation in the tracking is corrected, and this enables the range in which the tracking correction can be performed to be enlarged when the deviation occurring during tracking exceeds the maximum range in which the objective lens can be moved. However, when the deviation occurring during tracking exceeds the second standard range which is larger than the first standard range during the writing of data, it is determined that a tracking error is occurring, and writing of data on the optical memory card is stopped. This prevents the damage to the written data.

BEST MODE FOR CARRYING OUT THE INVENTION

Embodiments of the present invention will be described below.

Figure 1:
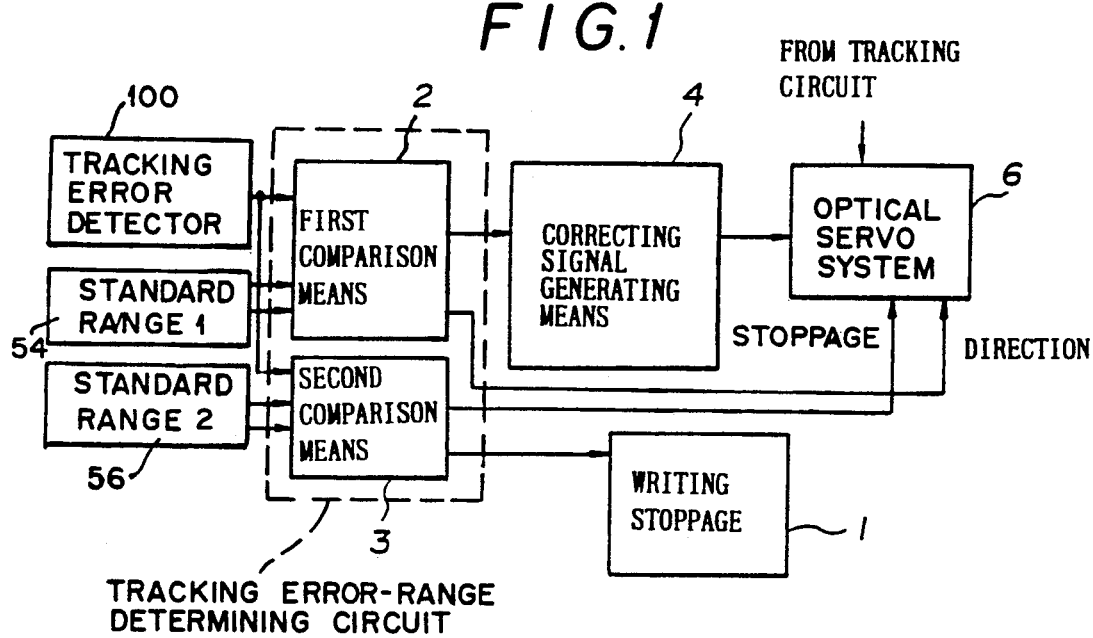
FIG. 1 is a block diagram, illustrating the structure of the present invention.
Figure 2:
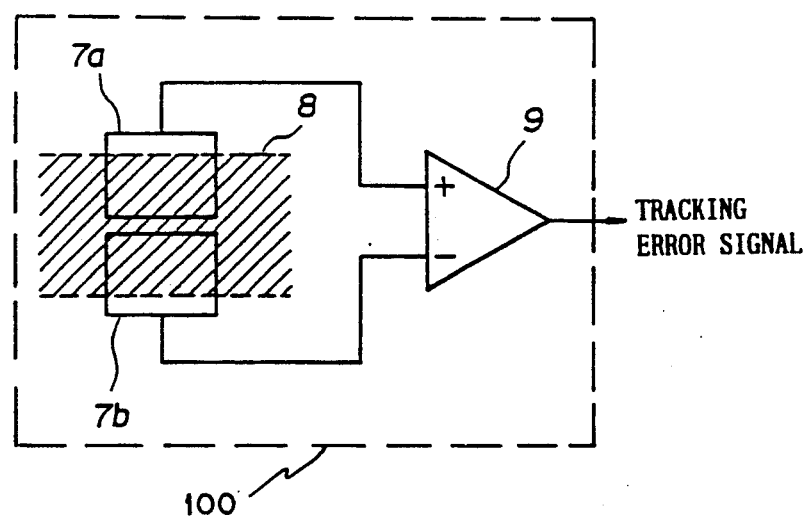
FIG. 2 illustrates how a tracking error signal is generated.
Figure 3:
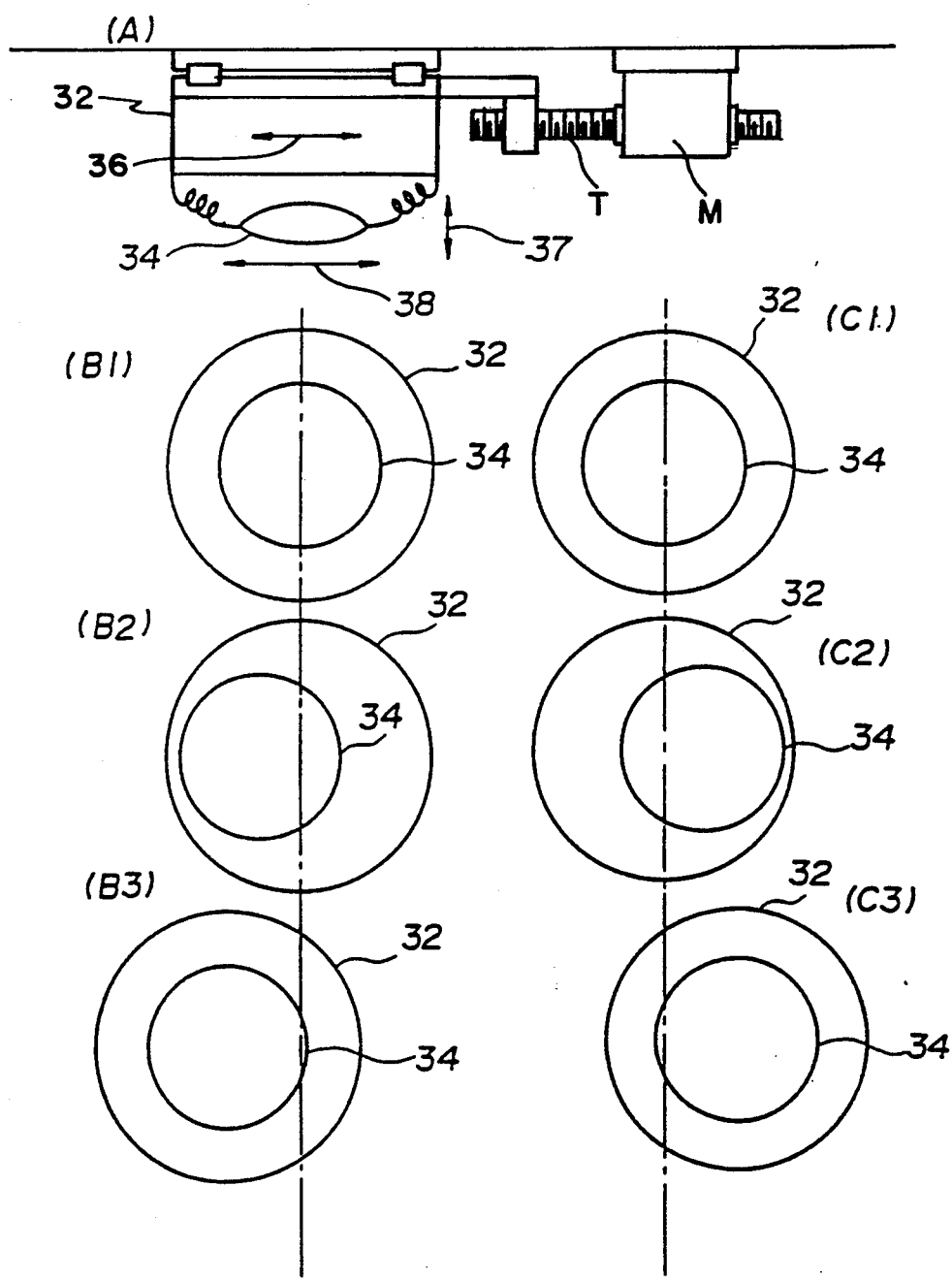
FIG. 3 illustrates the operation of the present invention.
Figure 4:
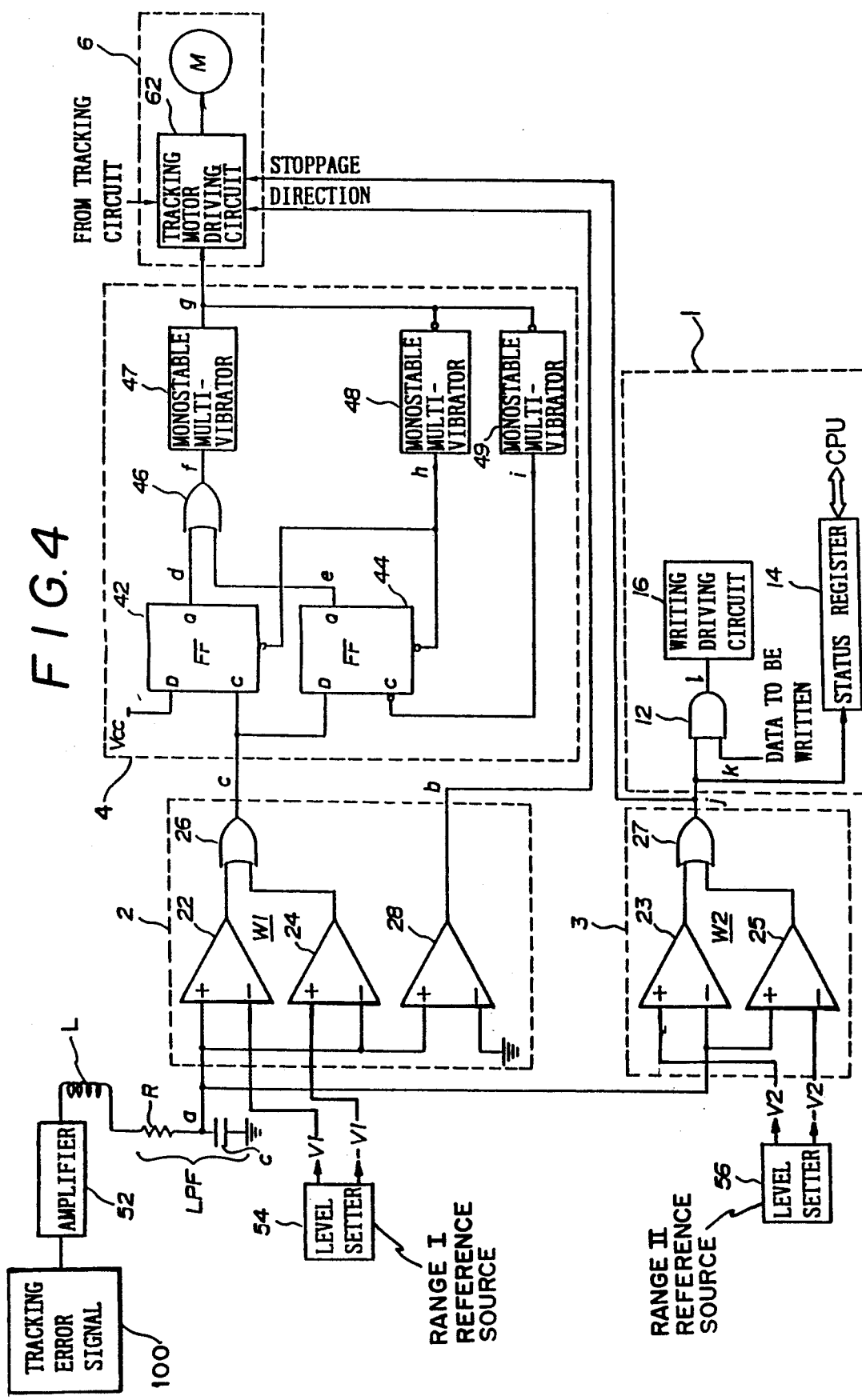
FIG. 4 is a circuit diagram of a tracking device, showing an embodiment of the present invention.

Referring first to FIG. 4, which is a block diagram of a tracking device for an optical memory card, a first embodiment will be described. The tracking error signal which has been discussed with reference to FIG. 2 is amplified by an amplifier 52, and this signal is passed through a tracking coil L and a low-pass filter (LPF). A resultant signal is then received by first comparison means 2 as tracking error information a. The low-pass filter is constituted by a resistor R and a capacitor C. It passes only the dc component of the tracking error signal. It may also be arranged such that the tracking error signal is input to the low-pass filter without being passed through the tracking coil L. The tracking coil L is fixed to an objective lens 34 movably held by a retaining portion or lens holder 32 shown in FIG. 3,(A) so as to move, together with a permanent magnet (not shown) fixed to the retaining portion 32, the objective lens 34 in a horizontal direction 38 by virtue of electromagnetic action. Although the objective lens 34 is also moved in a vertical direction 37 for the purpose of focusing control, it has no direct connection with the present invention, and more detailed explanations are therefore omitted. It is also to be noted that the illustration shown in FIG. 3, in which the objective lens 34 is held by coil springs, is only a schematic representation of a movable retaining structure of the objective lens 34.

The first comparison means 2 includes a window comparator consisting of comparators 22 and 24 and an OR gate 26, and a comparator 28 for generating a direction signal b. The comparator 22 receives the tracking error information a at its non-inverted input terminal and a voltage V1 delivered from a level setter or range reference source 54 at its inverted input terminal. The comparator 24 receives at its non-inverted input terminal a voltage −V1 delivered from the level setter 54 and at its inverted input terminal the tracking error information a. The OR gate 26 receives both of the outputs of the comparators 22 and 24, and outputs a signal c. The comparator 28 receives at its non-inverted input terminal the tracking error signal a and a grounded level at its non-inverted input terminal, and outputs the direction signal b. In order to prevent the comparators from responding to fine variations in the signals that occur in the vicinity of the comparison level, the comparators may be made hysteretic.

A correcting signal generating means 4 includes D flip-flops (hereinafter referred to as F/Fs) 42 and 44, an OR gate 46, and monostable multivibrators (hereinafter referred to as on-shot multivibrators) 47, 48 and 49. The F/F 42 receives at its input terminal D a positive voltage $V_{cc}$ and at its clock input terminal C the signal c delivered from the comparison means 2. The F/F 44 receives at its input terminal D the signal c and at its clock input terminal C an output i delivered from the one-shot multivibrator 49. An output h of the one-shot multivibrator 48 is input to reset input terminals R of the F/F 42 and 44. Outputs d and e of the F/F 42 and 44 are both input to the OR gate 46. The one-shot multivibrator 47 receives an output f of the OR gate, and delivers an output g to the one-shot multivibrators 48 and 49.

A retaining portion moving-means 6 or optical servo system includes a tracking motor M and a motor driving circuit 62. The driving circuit 62 receives a signal of a tracking circuit (not shown), the output signal g of the correcting signal generating means 4, and the direction signal b of the first comparison means 2 to drive the motor M. The motor M employed in this embodiment is a stepping motor drive. This stepping motor is connected to the retaining portion or lens holder 32 shown in FIG. 3 through a threading mechanism T. The retaining portion is moved to select a desired track on an optical memory card using the signal delivered from the tracking circuit, and the signal delivered from the correcting signal generating means is used to move the retaining portion for tracking correction.

A second comparison means 3 includes a window comparator W2 which consists of comparators 23 and 25 and an OR gate 27, like the window comparator W of the first comparison means 2. The second comparison means 3 differs from the first comparison means 2 in that the voltages that define the standard range are ±V2 delivered from a level setter or range reference source 56, and in that the OR gate 27 delivers a logical high signal when the tracking error information is within the standard range. The first comparison means together form a tracking error range determining circuit, as shown in FIG. 10.

A writing stopping means 1 includes an AND gate 12, a status register 14, and a writing driving circuit 16. The AND gate 12 receives at its one input terminal an output j of the second comparison means 3 and at its other input terminal data k. The writing driving circuit 16 receives the output of the AND gate 12, and writes data on an optical memory card. The status register 14 holds the output j temporarily. The contents of the status register 14 is referred to by a central processing unit periodically or when necessary.

Further, the output j of the second comparison means 3 is input to the tracking motor driving circuit 62 as a stoppage signal to stop the tracking motor M and thereby stop the movement of the retaining portion 32. As a result, damage to the written data, which occurs when the writing beam intersects the large number of tracks by the erroneous tracking, can be prevented. In other words, the second comparison means 3 also serves as retaining portion stopping means. It is preferable that stoppage of the tracking motor and stoppage of writing are conducted simulataneously. However, to conduct either of them is also effective.

Figure 5:
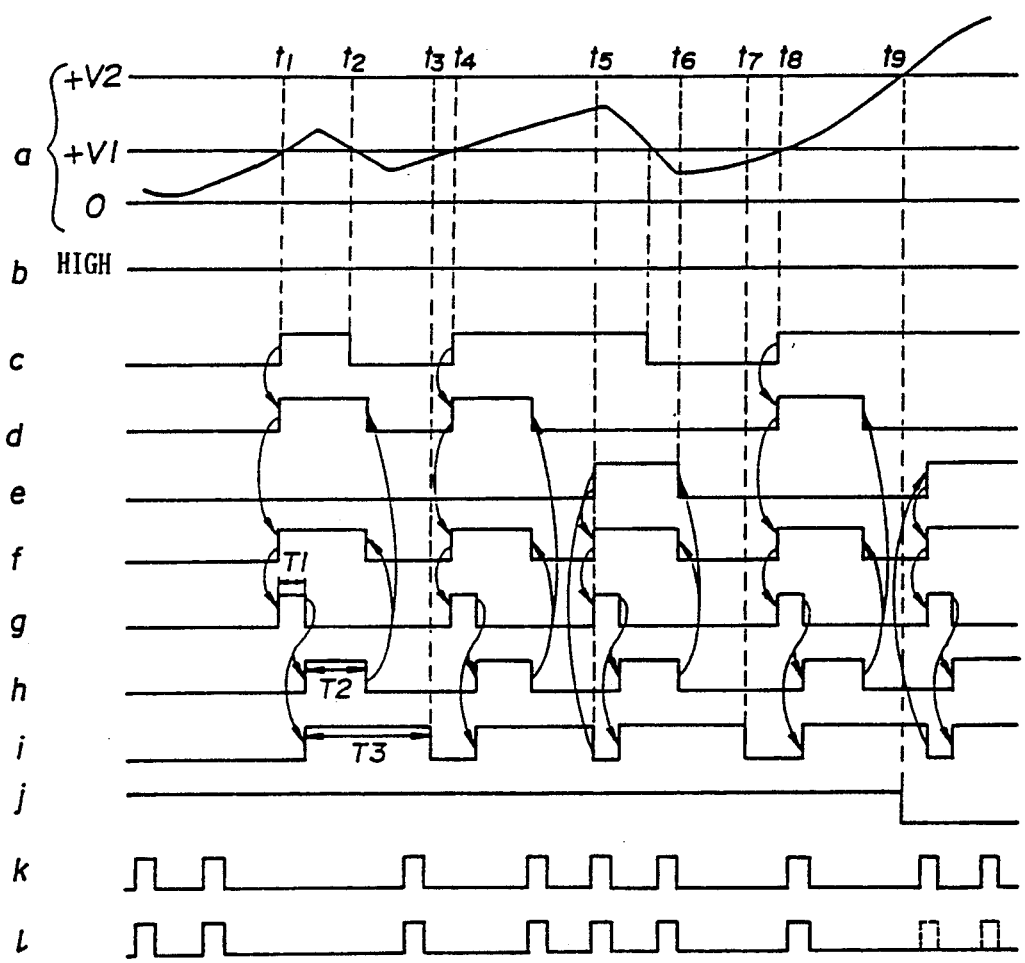
FIG. 5 shows the operation timings of the circuit of FIG. 4.
Figure 6:
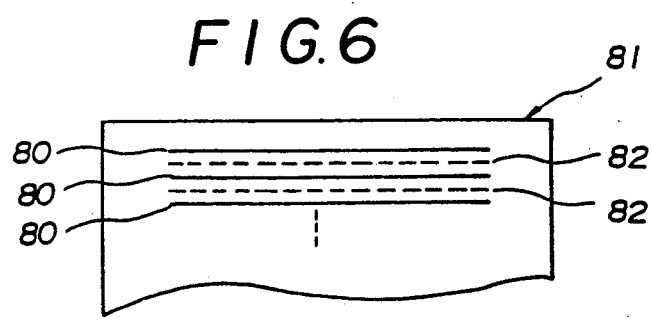
FIG. 6 is a schematic view of an optical memory card.
Figure 7A:
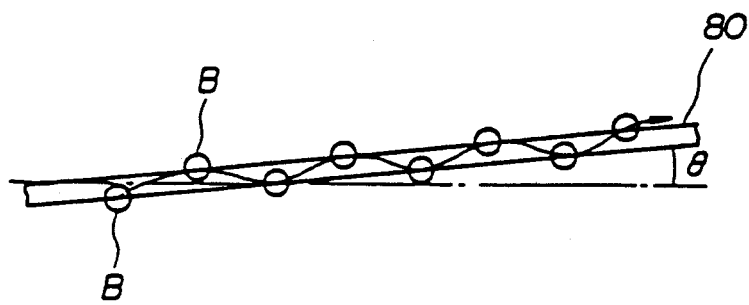
FIGS. 7A and 7B respectively illustrate tracking by an optical beam and an example of a tracking error signal.
Figure 7B:
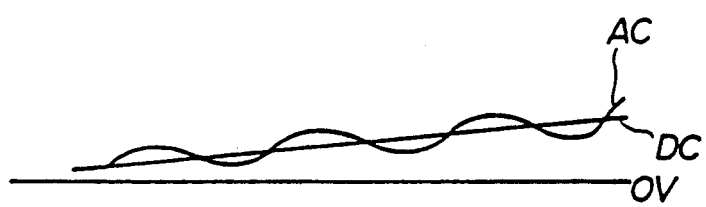
Figure 8:
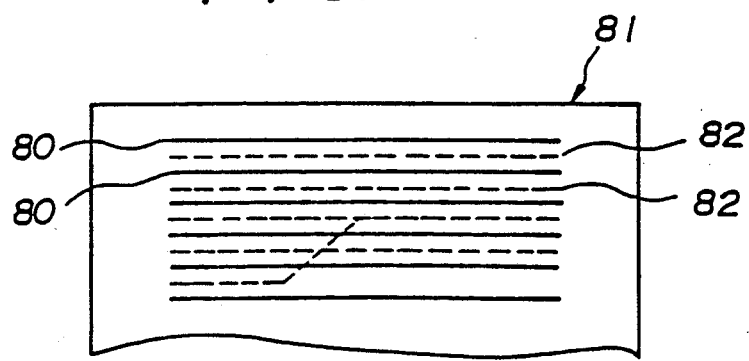
FIG. 8 illustrates erroneous writing of data.

Next, the operation of this writing device will be described with reference to FIG. 5. In the sample shown in FIG. 5, it is assumed that there exists a high degree of skew in the tracking lines. When the deviation occurring during tracking is within the range in which it can be corrected by moving the objective lens, tracking correction is performed and an optical beam B thus follows the coresponding tracking line in a zigzag fashion. The tracking error signal (shown in FIG. 2) used in this tracking correction is an AC signal containing a dc component corresponding to an angle $\theta$ of the skew, as shown in FIG. 7(B). The tracking error information a employed in this embodiment corresponds to this dc component.

The window comparators W in the first comparison means 2 compare the tracking error information a with V1 and −V1 delivered from the level setter 54 which define a standard range, and delivers a logical high signal when the tracking error information a is outside of the first standard range. The comparator 28 compares the tracking error information a with the grounded level, and produces a logical high direction signal b when the level of the tracking error information is higher than the grounded level. In the timing chart of FIG. 5, the direction signal b is shown as a logical high signal.

While the deviation occurring in the tracking is within the range in which it can be corrected by moving the objective lens, the tracking error information a remains within the first standard range. However, when the deviation in the tracking exceeds the range in which it can be corrected by moving the objective lens due to a relatively high degree of skew, it cannot be corrected by moving the objective lens, as shown in FIG. 3, (B2), and the tracking error information exceeds the first standard range. When the tracking error information a exceeds the voltage V1 at time t1 for the above-described reason, as shown in FIG. 5, the window comparator W1 delivers a logical high signal c. The F/F 42 in the correcting signal generating means 4 triggers at the leading edge of the signal c and reads the logical high signal present on the input terminal D. It then delivers a logical high signal d from an output terminal Q. This causes the OR gate 46 to deliver a logical high signal f, which triggers the one-shot multivibrator 47. Upon being triggered, the one-shot multivibrator outputs a pulse having a predetermined duration T1. This causes the motor M to be rotated by a unit angle through the driving circuit 62 so as to move the retaining portion by a unit amount in the direction defined by the direction signal b in which the objective lens can be moved. This enables correction of the deviation in the tracking to be performed again by moving the objective lens, as shown in FIG. 3, (B3), and the deviation occurring in the tracking is corrected. Thus, the tracking error information a falls below +V1 at time t2. The one-shot multivibrators 48 and 49 trigger on the mailing edge of the output pulse g of the one-shot multivibrator 47, and upon being triggered the one-shot multivibrator 48 generates a pulse h having a duration T2. The high-to-low transition of pulse h causes the F/F 42 to reset (to lower the output signal at the terminal Q), which in turn causes the pulses d and f to assume a logic low level. Upon being triggered by the output pulse g, the one-shot multivibrator generates a pulse i having a duration T3 (which is longer than T2), and the high-to-low transition of this pulse i causes the F/F 44 to read the status of the input terminal D (which is the signal c). Since the signal c is at a logic low level at time t3, the status of the output terminal Q remains low.

Further, the tracking error information a exceeds $+V_1$ again at time t4, generating the pulses c, d, f, g, h and i in the same manner as in the above-described first case. However, the second case differs from the first case in that the signal c is at a logic high level at time t5 when the pulse i falls. This causes the F/F 44 to generate a pulse e from the output terminal Q, thereby generating pulses f, g, h and i. The high-to-low transition of the pulse h which occurs at time t6 causes the F/F 44 to reset, thereby lowering the pulses e and f. Thus, in the case where the tracking error information a does not return to within the first standard range after one correcting pulse g has been output, the correcting signal generating means 4 automatically generates another correcting pulse g. As stated above, whether the tracking error information a has returned to within the first standard range is checked after T3 after the correcting pulse g has fallen. It may also be arranged that the one-shot multivibrators 48 and 49 trigger on the leading edge of the correcting pulse g. In that case, T2 and the T3 are increased by T1.

Furthermore, at time t7 when the pulse i falls, the signal c is at a logic low level, and no pulse e is generated. However, at a subsequent time t8, the tracking error information a exceeds $+V_1$ again, and this generates the pulse d, generating in turn f, g, h and i. Despite the fact that the tracking motor M has been driven by the correcting pulse g, the tracking error information a increases and exceeds the V2 which defines the second standard range at time t9 due to inability of reading of the tracking line owing to damage to or dust on the optical memory card. Since the data written on the card is damaged on such occasions, as stated above, the window comparator W2 of the second comparison means 3 delivers a logic low signal. This causes the AND gate 12 in the writing preventing means 1 to be blocked so that no data k is passed through the writing driving circuit 16. As a result, writing of data on the optical memory card by the writing driving circuit 16 is stopped, and erroneous writing is prevented. This state is recognized by the CPU through the status register 14, and is informed of the user. It may also be arranged such that, upon recognition of the above-described mulfunction, the CPU stops the generation of data to be written. This eliminates provision of the AND gate 12.

Further, as stated previously, the output j of the window comparator W2 is input to the tracking motor driving circuit 62 to stop the tracking motor M and thereby stop the movement of the retaining portion.

In the above-described embodiment, pulses are generated as the correcting signals, and the motor M is rotated by a unit angle in response to the correcting pulse. However, the motor M is not limited to a stepping motor. Further, the correcting signal may remain high until the tracking error information has returned to within the first standard range. Furthermore, the one-shot multivibrators may be replaced by counters.

What is claimed is:

1. A writing device for an optical memory card having a plurality of generally parallel data tracks formed adjacent to and extending along track lines, comprising:
   a lens, having an optical axis, for imaging data on the data tracks of an optical memory card along track lines;
   writing circuit means for writing data on the optical memory card by imaging the data through said lens;
   a lens holder which supports said lens, said lens and said lens holder both being mounted for movements at least in directions transverse to a track on the optical memory card;
   tracking error range determining means for detecting a tracking error resulting from deviations of said lens optical axis from a track line being tracked and for generating a first tracking error signal when the tracking error is within a first predetermined range $\pm V_1$ representing predetermined distance deviations between the track line and said lens optical axis, and generating a second tracking error signal when the tracking error is within a second predetermined range $\pm(V_2-V_1)$ representing distance variations which exceed the deviations corresponding to said first predetermined range, and a stop signal representing deviations which exceed said second predetermined range limit $\pm V_2$;
   drive means responsive to said tracking error detecting means for moving said lens relative to said lens holder to compensate for tracking error signals which fall within said first predetermined range and for moving said lens holder relative to said tracking line when said tracking error signals fall within said second predetermined range; and
   writing stoppage means for stopping the writing by said writing means of data on the optical memory card by issuance of a stop signal when said tracking error signals exceeds said first and second predetermined ranges, whereby the writing of data on the wrong data tracks is avoided when excessive deviations are detected.

2. A writing device for an optical memory card according to claim 1, wherein said tracking error range determining means comprises:
   a first comparison means for determining whether or not the tracking error signal is within said first predetermined range and for generating a first tracking error signal that represents a direction for correction;
   a second comparison means for determining whether or not the tracking error signal is within said second predetermined range and for generating a second tracking error signal; and
   correcting signal generating means for generating a first correcting signal for moving said lens upon the issuance of said first tracking error signal and for moving said lens holder in a direction indicated by said direction signal in response to a second correcting signal upon the issuance of said second tracking error signal from said first comparison means; and said writing stoppage means stops data writing upon the issuance of said stop signal.

3. A writing device for an optical memory card according to claim 2 wherein said writing stoppage means includes
   a writing driving circuit having means for inputting data; and gate means connected to said second comparison means for blocking data from being input to said writing driving circuit when said tracking error signal falls out of said second predetermined range.

4. A writing device for an optical memory card according to claim 1 wherein said writing stoppage means includes a writing driving circuit; and a status register connected to said second comparison means for storing the information representing whether or not said tracking error signal has fallen out of said second range whereby writing of data is stopped by the content of said status register.

* * * * *